United States Patent [19]

Swearingen

[11] Patent Number: 4,540,215
[45] Date of Patent: Sep. 10, 1985

[54] LOCK SYSTEM FOR REMOVABLE AUTOMOBILE ROOF PANEL

[76] Inventor: Ralph M. Swearingen, 5444 Peterson La., Dallas, Tex. 75240

[21] Appl. No.: 475,917

[22] Filed: Mar. 16, 1983

[51] Int. Cl.³ ............................................... B60J 7/18
[52] U.S. Cl. ................................... 296/218; 296/224; 292/36; 292/153; 49/465
[58] Field of Search ..................... 296/216, 218, 224; 292/7, 36, 153, DIG. 5; 49/465

[56] References Cited

U.S. PATENT DOCUMENTS

| | | | |
|---|---|---|---|
| 2,586,648 | 2/1952 | Hale et al. | 292/DIG. 5 |
| 2,628,117 | 2/1953 | Robinson | 292/36 X |
| 2,674,480 | 4/1954 | Vigmostad | 292/DIG. 5 |
| 4,182,144 | 1/1980 | Leivenzon et al. | 292/36 X |
| 4,223,943 | 9/1980 | Van Hulle et al. | 292/DIG. 5 |
| 4,249,770 | 2/1981 | Hunt | 296/224 X |
| 4,302,045 | 11/1981 | McAdams | 296/224 |
| 4,362,328 | 12/1982 | Tacheny et al. | 292/36 |
| 4,367,454 | 1/1983 | Modica | 296/218 X |

*Primary Examiner*—Robert B. Reeves
*Assistant Examiner*—Russell D. Stormer
*Attorney, Agent, or Firm*—Hubbard, Thurman, Turner & Tucker

[57] ABSTRACT

A lock mechanism for a removable automobile roof panel comprising a cylinder type lock having a lock lever arm rotatable into a position to engage the roof panel latch pin actuating mechanism to prevent movement of a manual latch lever from the latch pin extended position to the pin retracted position. An alternate embodiment provides a cylinder type lock assembly which is supported between bracket members mounted adjacent a latch pin crank link. The presence of the lock assembly prevents rotation of the crank to retract the latch pins.

5 Claims, 9 Drawing Figures

U.S. Patent    Sep. 10, 1985    Sheet 1 of 3    4,540,215

LOCK SYSTEM FOR REMOVABLE AUTOMOBILE ROOF PANEL

BACKGROUND OF THE INVENTION

1. Field of the Invention

The present invention pertains to a lock mechanism for locking the latch assembly of a removable automobile roof panel in the closed condition to prevent unwanted removal of the panel.

2. Background

Modern sport automobiles having removable roof panels have become particularly popular since the demand for soft top convertibles has decreased and since the requirements for vehicle rollover protection have become more stringent. Removable roof panel configurations or T-tops, as they are commonly called, provide and open air atmosphere of a convertible automobile while retaining the roof structure intact to provide occupant protection in the event of vehicle roll over. The increasing popularity of vehicles with these removable panels has resulted in numerous cases of unwanted removal of the panels and has produced a particularly acute need for a locking mechanism which will prevent actuation of the panel latch mechanism to release the panel from its latched position on the vehicle roof.

The compact and relatively complex mechanical linkage used in several vehicle roof panel designs, and the need to provide a mechanism which may be retrofitted to existing roof panel units without detracting from the appearance of the panel has presented a problem in the art of automotive vehicle design and servicing. The present invention is directed to a particularly unique and easily installed lock mechanism for removable automobile roof panels which meets the desiderata in the art as indicated hereinabove and as will be further appreciated by those skilled in the art upon reading the discussion and detailed description herein.

SUMMARY OF THE INVENTION

The present invention provides a lock system for locking the latch mechanism of a removable automobile roof panel to prevent actuation of the latch mechanism to release the panel from its secured position on the vehicle roof.

In accordance with one aspect of the present invention there is provided a lock system including a key actuated lock having a member which, in the locked position, prevents operation of the panel latch mechanism to retract a pair of opposed latch pins securing the removable panel to the vehicle roof.

In accordance with another aspect of the present invention there is provided a lock mechanism including a cylinder type lock and a lock mounting plate which may be fitted to the latch lever support plate of a removable automobile roof panel and wherein the lock mechanism includes a member which is adapted to prevent unwanted actuation of the panel latching lever. In accordance with yet a further aspect of the present invention there is provided a lock mechanism which includes a support plate which is adapted to be fastened to a latch mechanism mounting plate by fastener means which are inaccessible in the closed position of the latching mechanism to prevent unwanted disassembly of the lock mechanism from the mounting plate.

In accordance with still a further aspect of the present invention there is provided a lock mechanism which is adapted to prevent actuation of a crank link interconnecting the panel latch pins.

The locking mechanisms of the present invention are particularly adapted to be fitted under a removable latch mechanism cover for the roof panel so as to not detract from the appearance of the panel and to minimize the risk of injury from unwanted contact with the lock mechanism.

The disclosed embodiments of the lock mechanism also are particularly adapted to be retrofitted to existing roof panels without modifying the latch mechanism itself.

Those skilled in the art will recognize the advantages and superior features of the invention discussed hereinabove as well as further important aspects thereof upon reading the detailed description which follows in conjunction with the drawings.

DESCRIPTION OF THE PREFERRED EMBODIMENTS

Figure 1:
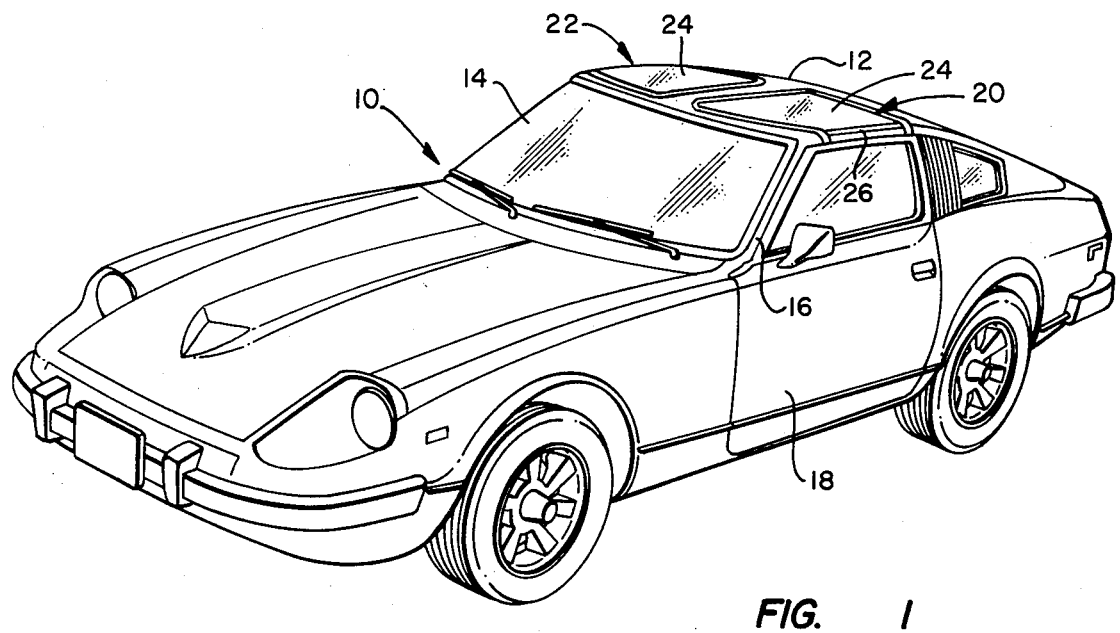
FIG. 1 is a perspective view of an automobile of a type having a pair of removable roof panels.

In the description which follows, like parts are marked throughout the specification and drawings with the same reference numerals, respectively. The drawings are not necessarily to scale and certain features of the invention may be exaggerated in scale or shown in schematic form in the interest of clarity and conciseness.

Referring to FIG. 1, there is illustrated an automotive vehicle, generally designated by the numeral 10, comprising a two door coupe having an integral roof 12, a windshield 14 mounted in a windshield frame 16 and opposed doors 18, one shown in FIG. 1, for entry and exit with respect to the vehicle. The roof 12 is adapted to include a pair of removable roof panels 20 and 22 each of which may include a glass portion providing a skylight, generally designated by the numeral 24. The roof panel 20, for example, includes a generally perimeter type frame or sash 26 which includes means for securing the panel to the roof 12 to provide all weather protection for the vehicle occupants. However, the roof panels 20 and 22 are adapted to be easily removed by actuation of a latch mechanism from the interior of the vehicle to release the panels for liftout of a cooperating recess formed in the roof 12. The panel 22 is substantially of the same construction as the panel 20 but is of the opposite hand or comprises a mirror image of the panel 20.

Figure 2:
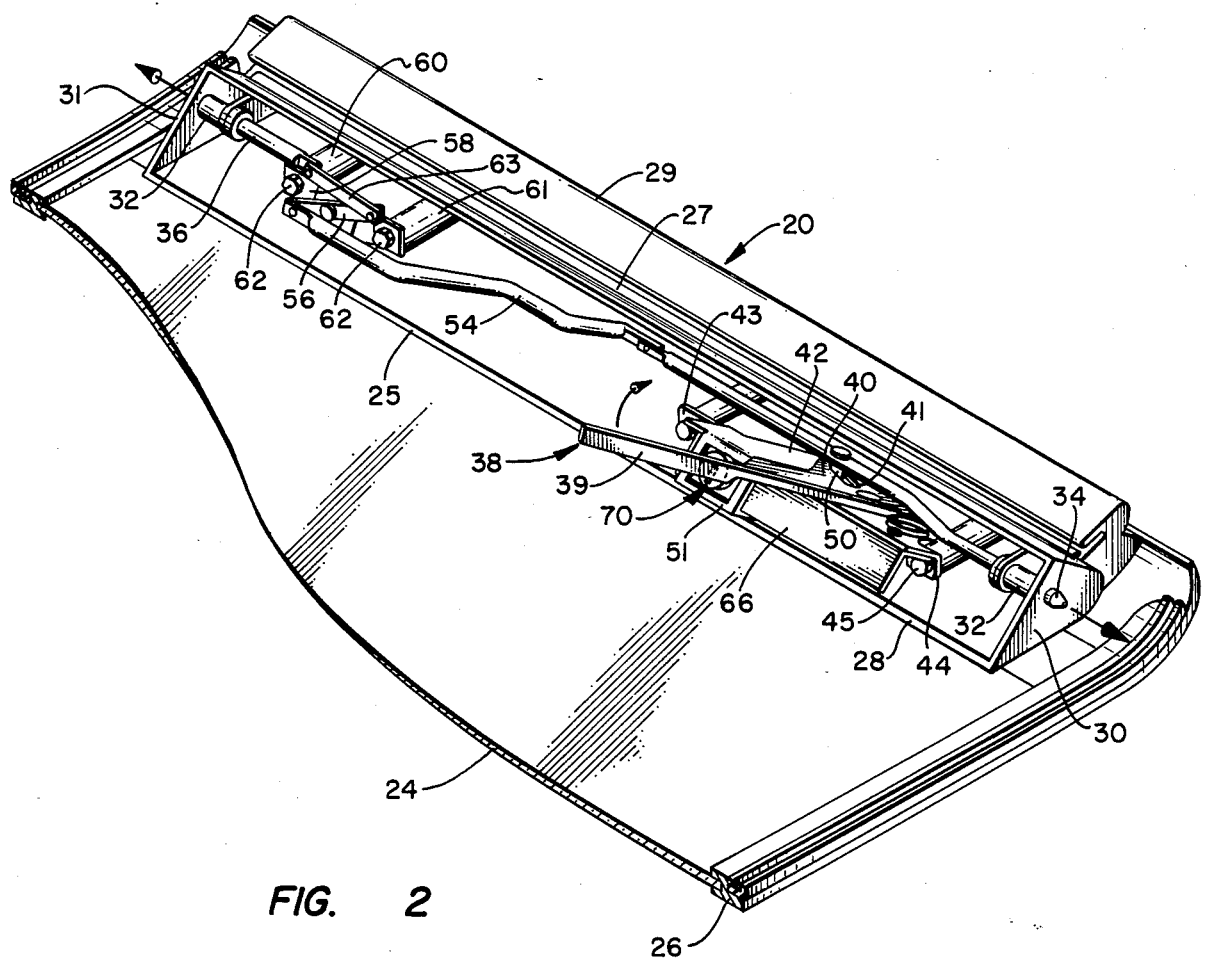
FIG. 2 is an inverted perspective view of a portion of one of the roof panels illustrating the arrangement of the mechanism for latching the panel on the vehicle roof.
Figure 3:
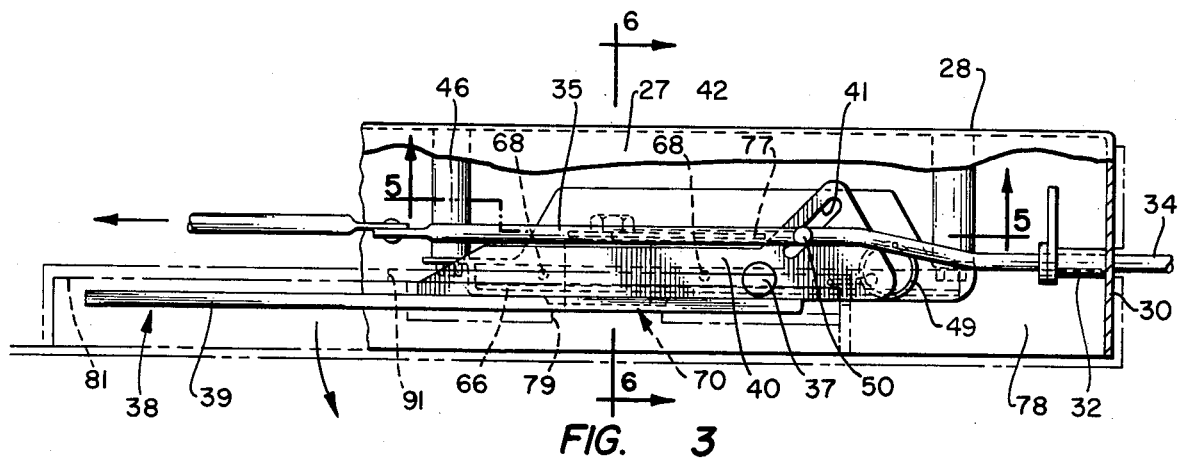
FIG. 3 is a detail plan view illustrating the panel latch mechanism of the panel shown in FIG. 2 in the closed position for securing the panel on the vehicle roof.
Figure 4:
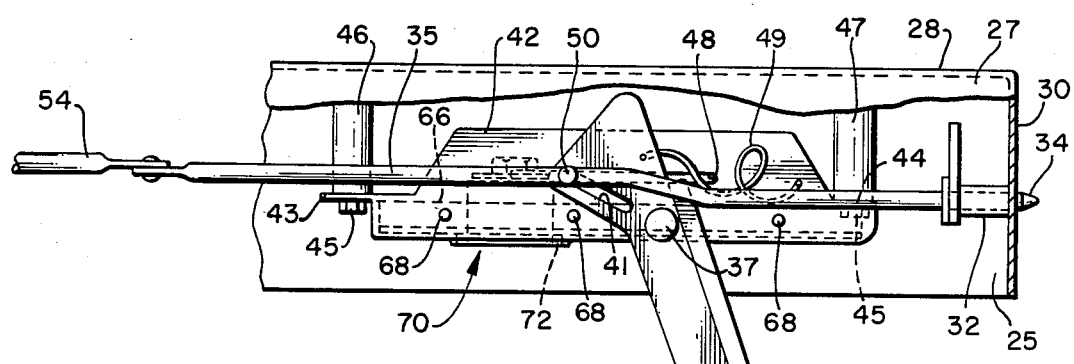
FIG. 4 is a detail plan view showing the latch mechanism in the position for unlatching the roof panel.

Referring now to FIGS. 2, 3 and 4, there are illustrated certain details of the latching mechanism for the panel 20. The latching mechanism for the panel 22 is of the same construction; however, certain parts are of the opposite hand. As shown in FIG. 2, the panel frame 26 includes a frame member 28 disposed adjacent to a weatherstrip 29. The frame member 28 is of a somewhat troughlike cross-section having opposed sidewalls 25 and 27 and opposed gusset end portions 30 and 31 which are, respectively, adapted to support a bearing sleeve 32, for a pair of opposed latch pins 34 and 36. The latch pins 34 and 36 are adapted to extend into cooperating recesses in the windshield frame and roof structure, not shown, for latching the panel 20 in its secured position on the vehicle roof. The panel 20 may also include a cooperating pin and slot anchoring mechanism, not shown, for securing the longitudinal side of the panel opposite the frame member 28 to the vehicle roof.

The latching mechanism for the panel 20 further comprises a latch actuating lever 38 having a handle portion 39 and a platelike body portion 40 which includes an elongated cam slot 41 formed therein. The latch lever 38 is pivotally mounted at 37 on a support plate 42 which includes a pair of spaced apart projections 43 and 44, FIG. 4, for supporting the plate on the panel frame member 28 by removable fasteners 45 securing the plate to spaced apart bosses 46 and 47.

Figure 5:
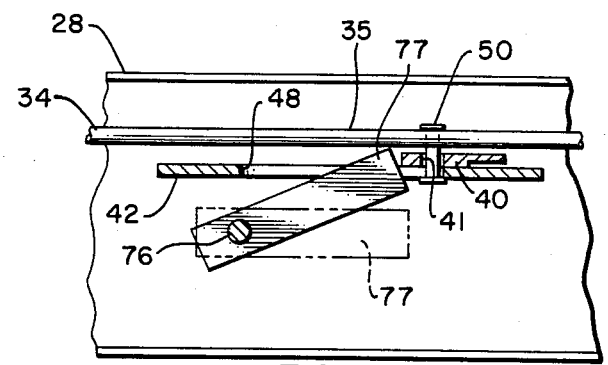
FIG. 5 is a section view taken along line 5—5 of FIG. 3.
Figure 6:
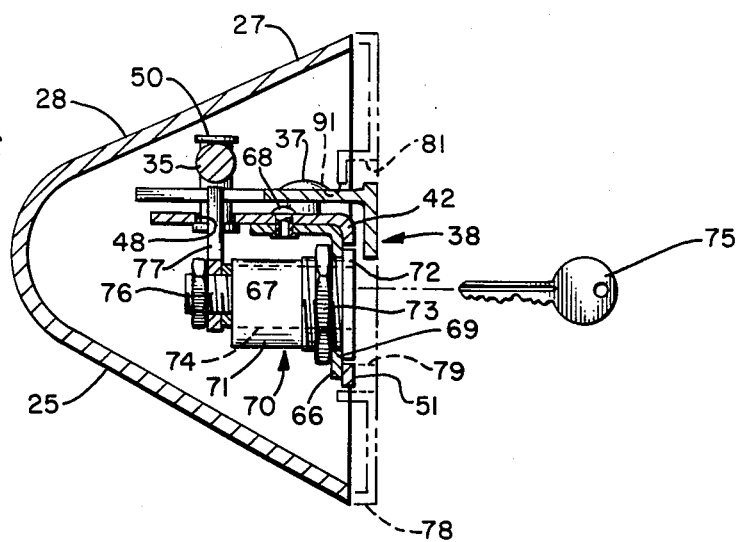
FIG. 6 is a section view taken along line 6—6 of FIG. 3.

Referring also to FIGS. 5 and 6, the support plate 42 includes an elongated slot 48 which extends generally parallel to a shank portion 35 of the pin 34 and which is adapted to receive a pivot pin 50 extending through the slot 41 and secured to the shank portion 35. A torsion coil spring 49, FIGS. 3 and 4, is connected between the support plate 42 and the lever body 40 for biasing the lever in the retracted or latch pin extended position, and in the unlatched position wherein the lever handle extends generally perpendicular to the direction of movement of the latch pins 34 and 36.

Referring again to FIG. 2, the integral shank portion 35 is connected to a link 54 which is pivotally connected to a crank member 56. The crank member 56 is pivotally supported on the frame member 28 by a member 58 which is mounted on two spaced apart bosses 60 and 61 by respective fasteners 62. The bosses 60 and 61 are preferably integrally formed as part of the frame member 28. The end of the crank member 56 opposite that connected to the link 54 is connected to a further link member 63 which is also pivotally connected to the latch pin 36.

In response to movement of the latch lever 38 from the retracted position shown in FIG. 3 to the extended or unlatching position shown in FIGS. 2 and 4, the latch pins 34 and 36 move in opposite directions to each other to retract from the aforementioned recesses in the vehicle roof and windshield frame. In response to the movement of the lever 38 in the opposite direction the pivot pin 50 moves along the slot 41 and the slot 48 to extend the latch pin 34 into the locking position. Movement of the latch pin 34 occurs simultaneously with movement of the latch pin 36 in the opposite direction through movement of the link 54, the crank member 56 and the link 63.

Referring now primarily to FIGS. 3, 5 and 6, the latch locking mechanism of the present invention is characterized by a lock support plate 66 which is formed as a somewhat angle shaped member having a leg 67 adapted to be secured to the latch lever support plate 42 by a plurality spaced apart fasteners such as rivets 68. The lock support plate 66 includes a leg 69 projecting at substantially right angles to the leg 67 and supportive of a cylinder type lock assembly, generally designated by the numeral 70. The lock assembly 70 is of a type generally well known including a cylinder member 71 having an integral flange 72 and a mounting nut 73 cooperable with a threaded portion on the exterior of the cylinder member for securing the lock assembly to the leg 69 of support plate 66 and extending through a suitable bore formed therein. The lock assembly 70 includes a rotatable lock plug 74 which is adapted to rotate in response to insertion of a key 75, FIG. 6, into the plug. The plug 74 includes shank 76 suitably supporting a lever arm 77 extending perpendicular to the axis of rotation of the lock plug.

With the lock support plate 66 mounted on the lever support plate 42 as shown the lock lever arm 77 is adapted, in the normal locking position, to project into the slot 48, see FIG. 5, to prevent movement of the lever 38 from its retracted and the latch pin extended position to the pin unlatched position. Insertion of the correct key into the lock plug 74 will result in displacement of the lock tumblers so that the plug may be rotated to rotate the lever arm 77 out of the slot 48 in the support plate to the position shown by the dashed lines in FIG. 5 to provide clearance for movement of the lever 38 to the panel unlatched position shown in FIGS. 2 and 4. Accordingly, the panel 20 may not be removed from its intended position on the roof 12 without operation to release the lever 38 by actuation of the cylinder type lock assembly 70.

In the particular embodiment of the roof panel illustrated the lock support plate 66 and the lock assembly 70 have been adapted to be retrofitted to existing roof panels on vehicles including the Datsun 280Z series automobiles manufactured by Nissan Motor Co., Ltd., Tokyo, Japan. In this regard, a digitally actuated lever arm securing member, not shown, associated with the original equipment panel 20 may be removed and the lock cylinder 71 positioned to project into an opening in a depending portion 51 of the support plate 42 previously occupied by the lever arm securing member. In this respect a removable cover 78 for covering the latching mechanism, partially shown in phantom in FIGS. 3 and 6, does not require modification to an opening 79 formed in the cover for the aforementioned lever securing mechanism. Accordingly, the cover opening 79 also serves as the opening for access to the lock plug 74 by its associated key member without requiring modification of the cover member 78. Moreover, the arrangement of the support plate 66 and the support plate 42 advantageously provides for shielding the fasteners 68 securing the two plates together when the latch lever 38 is in the closed position thanks to the position of the lever body portion 40 which substantially prevents easy access to the fasteners 68. The cover member 78 is provided with a recess 81, FIG. 3, including an elongated slot 91 for receiving the lever arm 39 in the retracting position of the latch lever but the cover member itself cannot be removed from the frame member 28 unless the lever is rotated to the position shown in FIG. 4.

Figure 7:
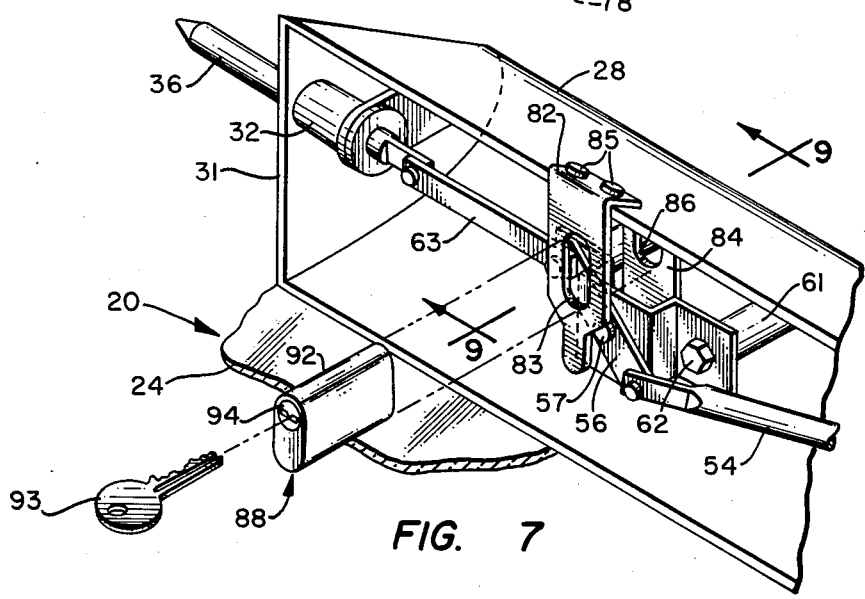
FIG. 7 is a perspective view of an alternate embodiment of the present invention.
Figure 8:
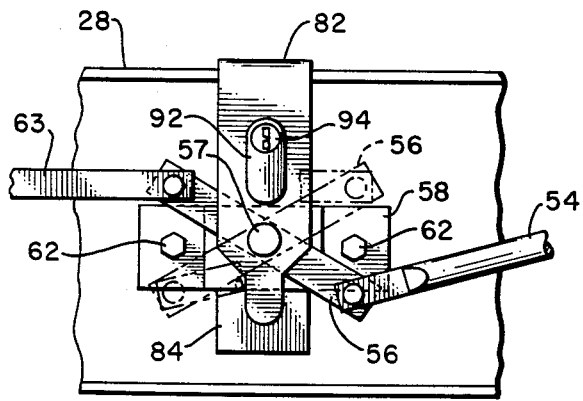
FIG. 8 is a detail elevation of the mechanism shown in FIG. 7.
Figure 9:
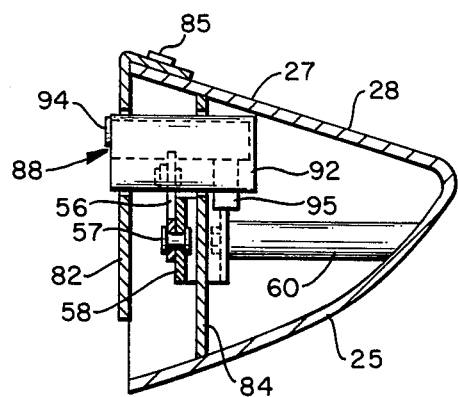
FIG. 9 is a section view taken along line 9—9 of FIG. 7.

Referring now to FIGS. 7, 8 and 9, there is illustrated an alternate embodiment of a lock arrangement for locking the latch assembly for the roof panel 20 in the latch pin extended and locked position. In the arrangement illustrated in FIGS. 7 through 9, a pair of spaced apart support bracket members 82 and 84 are arranged on opposite sides of the crank member 56 as illustrated. Bracket member 84 is preferably disposed between the bosses 60 and 61 and may be fixed to the frame member 28 or positioned by close dimensional fitting of the bracket between the bosses and captured therebetween by the pivot support member 58 and the opposed sidewalls 25 and 27 of frame member 28. The bracket member 82 is secured to one edge of the frame sidewall 27 by suitable fastening means such as rivets 85.

The bracket members 82 and 84 are provided with respective elongated openings 83 and 86 which are aligned with each other and are adapted to receive an oblong cylinder type lock assembly, generally designated by the numeral 88. The lock assembly 88 is of conventional construction having a cylinder member 92 of a generally oval or oblong cross-sectional shape and adapted to support a rotatable lock plug 94 which is operable to rotate to retract a bolt 95 when a key 93 is inserted in the plug to properly displace the tumbler pins. The lock assembly 88 may be inserted through the openings 83 and 86 of the bracket members when the crank member 56 is rotated about its pivot 57 into the position associated with the extended and latching condition of the latch pins 34 and 36, which position is shown by the solid lines in FIG. 8.

Accordingly, with the cylinder lock assembly 88 extending between the bracket members 82 and 84 and supported thereby, the crank member 56 may not be rotated to retract the latch pin 36. Since the linkage for the latch pin 34 is also connected to the crank member, the retraction of both pins is prevented. The lock assembly member 88 is of a type somewhat similar to the lock assembly 70 but is provided with the spring biased bolt 95 which extends transversely from the distal end of the lock cylinder. When the lock assembly 88 is disposed in the opening 85 and supported by the bracket member 84, and with the bolt 95 extended, the lock assembly may not be removed from the bracket members. Rotation of the lock plug 94 with the key 93 inserted therein will effect retraction of the bolt 95 to permit insertion and removal of the lock assembly with respect to bracket members.

Although utilization of the lock arrangement described herein in conjunction with FIGS. 7, 8 and 9, requires slight modification of the cover member 78 this modification is basically one of providing a suitable opening for access to the lock assembly 88 so that it may be inserted and withdrawn from the bracket members 82 and 84. In both embodiments of the lock assembly described herein the locks are disposed behind the normal position of the cover member 78 and within the envelope formed by the cover member and the frame member 28 so that the locks do not project into the space defined by the occupant compartment of the vehicle. In this respect the lock assemblies do not present any hazard to the occupants of the vehicle passenger and driver's compartment.

Although the lock mechanisms have been described in conjunction with the removable roof panel 20 a substantially identical arrangement may be provided for the panel 22. Moreover, two embodiments of a lock system have been disclosed which are particularly adapted to be retrofitted to existing roof panel assemblies. Those skilled in the art will recognize that the lock assemblies may be modified and/or a latch mechanism may be modified to accommodate a lock mechanism of similar design and concept and that various other substitutions and modifications may be made to the specific embodiments illustrated and described herein without departing from the scope and spirit of the invention as recited in the appended claims.

What I claim is:

1. An anti-theft lock system for a removable automobile roof panel, said panel including a frame adapted to support a latch mechanism for releasably latching said panel in a predetermined position in an opening in an automobile roof, said latch mechanism including a lever connected to latch means and operable to move said latch means between latching and release positions, said lever being pivotally mounted on said frame and connected to link means interconnecting said lever and said latch means;

said lock system including a lock assembly including a lock cylinder supported by a plate member supported on said frame by fastener means located so as to be covered by said lever in the latching position of said lever to prevent access to said fastener means, and a lock plug rotatable in said cylinder, and said lock assembly including an arm connected to said plug and projecting into a position to prevent movement of said lever to the release position in a first position of said plug, said plug being rotatable by key means inverted therein to rotate said arm to permit movement of said lever.

2. The lock system set forth in claim 1 wherein:

said panel includes a cover for said frame including an opening therein, and said plate is adapted to support said lock assembly on said frame so that a key may be inserted in said lock plug through said opening.

3. In a removable automobile roof panel, a frame, a latch mechanism for releasably latching said panel in a predetermined position in an opening in a automobile roof, said latch mechanism including a lever supported on a support member and connected to panel latch means and operable to move said latch means between latching and release positions; and an anti-theft lock assembly associated with said latch mechanism to prevent unwanted actuation of said latch mechanism to release said panel for removal from said roof, said lock assembly including a lock cylinder supported by a plate member secured to said frame, and a lock plug rotatable in said cylinder in response to insertion and turning of a key, said lock assembly comprising an arm connected to said plug and projecting into a locking position to engage means preventing movement of said lever to the release position, said arm being movable to a release position to permit movement of said lever and said latch means;

said plate member is secured to said support member by spaced apart fastener means, and said lever includes a body portion disposed over said fastener means in the latching position of said lever to prevent access to said fastener means for the removal thereof.

4. In a removable automobile roof panel a frame member, a latch mechanism supported by said frame member for releasably latching said panel in a predetermined position in an opening in an automobile roof, said latch mechanism including a lever, panel latch means operable to move between latching and release positions and link means connected to said lever and said latch means, said link means including a crank member pivotally mounted on said frame member, spaced apart bracket means supported by said frame member and disposed on opposite sides of said crank member with respect to the plane of rotation of said crank member, said bracket means each including an opening therein; and an anti-theft lock assembly comprising a cylinder member and a retractable bolt adapted to be disposed in said openings and supported by said bracket means, said lock assembly being engageable with said crank member to prevent rotation of said crank member to prevent movement of said lever to a release position.

5. An anti-theft lock assembly for a removable automobile roof panel, said panel including a frame adapted to support a latch mechanism for releasably latching said panel in a predetermined position in an opening in an automobile roof, said latch mechanism including a lever pivotally mounted on said frame and connected to latch means for moving said latch means between latching and release positions, said lock assembly including a member supported on said frame by fastener means located so as to be covered by said lever in the latching position of said lever to prevent access to said fastener means, and said lock assembly including a lock member projecting into a position to prevent movement of said lever to the release position in a first position of said lock member, said lock member being movable by key means inserted in said lock assembly to move said lock member to permit movement of said lever.

* * * * *

UNITED STATES PATENT AND TRADEMARK OFFICE
CERTIFICATE OF CORRECTION

PATENT NO. : 4,540,215
DATED : September 10, 1985
INVENTOR(S) : Ralph M. Swearingen It is certified that error appears in the above-identified patent and that said Letters Patent is hereby corrected as shown below:

Column 1, line 19, "and" should be --the--.

Column 6, line 28, "inverted" should be --inserted--.

Signed and Sealed this

Fourteenth Day of January 1986

[SEAL]

Attest:

Attesting Officer

DONALD J. QUIGG

Commissioner of Patents and Trademarks